Patented June 28, 1949

2,474,781

UNITED STATES PATENT OFFICE 2,474,781

METHOD FOR PRODUCING PYRAZINE BY CATALYTIC DEHYDROGENATION OF PIPERAZINE

James Kenneth Dixon, Riverside, Conn., assignor to American Cyanamid Company, New York, N. Y., a corporation of Maine No Drawing. Application April 12, 1946, Serial No. 661,874

17 Claims. (Cl. 260—250)

This invention relates to catalytic dehydrogenation in the vapor phase of piperazines and/or hydrates of piperazines. More particularly, it relates to the use as catalysts therefor, of the difficultly-reducible oxides of the elements of the left-hand sub-groups of the fifth, sixth and seventh groups in the periodic arrangement of the elements. As such the present invention constitutes a continuation-in-part of my copending original application, Serial No. 443,703, filed May 20, 1942, now Patent No. 2,400,398.

Pyrazine, as an intermediate for the manufacture of aminopyrazines, and ultimately sulfanilamidopyrazines, has become of increasing commercial importance, particularly in the field of chemotherapy. Unfortunately, while pyrazine itself is comparatively well known, processes for its production which are suitable for development on a commercial scale have not been available. In the past, production has always been on a comparatively small scale, by inefficient processes giving yields of about 3–6%.

By way of contrast, piperazine, differing from pyrazine only by the degree of hydrogenation, may be obtained by a number of different procedures and is commercially available either in relatively pure form or as a hydrate such as the hexahydrate. Accordingly, on the basis of availability alone, piperazine would appear to be a suitable raw material to serve as a commercial source of pyrazine. It would appear theoretically possible to convert piperazine, $C_4H_{10}N_2$, to pyrazine, $C_4H_4N_2$, simply by removing the extra hydrogens.

The simplicity of this reaction, however, is more apparent than real. Actually the dehydrogenation is very difficult to carry out. Prior to this invention, no method was known of carrying out this reaction in an economically feasible manner. The reaction is difficult to initiate, a high temperature being necessary. Therefore, the problem is complicated in that dehydrogenation from piperazine to pyrazine will not be the only reaction to occur. Under the temperature conditions required, the ring structure will be expected to be cracked with concurrent formation of side reaction products and ammonia. Therefore, the reaction is not only difficult to initiate but when started is difficult to direct.

Under these conditions, a catalyzed reaction offers the most likelihood of success, but whether cracking or dehydrogenation will be catalyzed is wholly unpredictable. In fact, because of the structure of the pyrazine ring, containing two symmetrically-positioned heterocyclic nitrogen atoms, the cracking reaction is the most reasonable to anticipate.

A catalyst suitable for the purpose therefore must be one meeting definite requirements. As a first consideration the catalyst must be capable of initiating and carrying out dehydrogenation. Secondly, the catalyst must have the minimum possible tendency to promote cracking, both of the piperazine and of the dehydrogenation products.

A desirable catalyst also must meet certain economical requirements if it is to be used in a feasible commercial process. The catalyst should be one which is readily available, has a reasonable life, is not poisoned by any materials necessarily present in the reaction vessel and is operable at a feasible temperature. The catalyst should preferably be capable of being readily reactivated. This latter is particularly important in a commercial operation. Finally, the desired catalyst should be one adapted to use in a continuous process.

These requirements make the search for a suitable catalyst much more exacting. Nevertheless, if such a catalyst can be found, the process of continuously converting piperazine to pyrazine remains a prospectively desirable commercial operation.

It is, therefore, the object of the present invention to find a suitable continuous process for the dehydrogenation of piperazine to pyrazine on a commercially-feasible basis. It is also an equally important object of the invention to find a catalyst, or group of catalysts, suitable for use in that process.

In general, the objects of the present invention are accomplished by continuous catalytic dehydrogenation of the piperazine to pyrazine in the vapor phase. In so doing, use is made of a catalyst capable of representation by the designation $MO_3$, $M_2O_5$, $M_2O_3$ and $MO_2$, where M is a radical of an element contained in the left-hand sub-groups of the fifth, sixth and seventh groups of the Mendeleeff periodic arrangement of the elements.

In general, the process steps of the present invention may be simply carried out. Piperazine is vaporized and the resultant vapors, preferably after preheating, are passed over the selected dehydrogenation catalyst. The rate of vapor flow and correspondingly the contact time with the catalyst may be regulated by the rate at which piperazine is fed to the vaporizer and/or blending an inert vapor therewith. Introduction of the inert vapors may be before or during the preheating. After being passed over the catalyst, the reacted vapors are condensed and the pyrazine collected therefrom, usually by fractionation. If so desired unreacted piperazine can be readily recovered and recycled.

As compared with the prior art processes, yielding 3–6% of pyrazine, in the present process yields of up to about 65–70% or more of pyrazine, with a total piperazine conversion of 90% or better, can be obtained in a single pass through the catalytic zone. By recycling the unreacted piperazine even better overall results are obtainable.

While it is an advantage of the present invention that it is not limited to any particular apparatus or organization of apparatus, certain elements are found to be extremely useful in carrying out the process. For example, the piperazine should pass through the catalytic zone at a predetermined rate. Therefore some feed control means should be provided to perform this regulation. It is also more or less necessary to control the amount of diluent gas or vapor and thereby control the time of contact with the catalyst. These controls may be fairly simple. For example, a rate of flow indicator and a hand valve may be used. If so desired, a more complicated system of automatic controls may be used.

While it is not absolutely essential to do so, for the best results the material should be fully vaporized before reaching the catalyst in order that a substantially uniform catalysis be obtained. In order to accomplish this it was found that the provision of a vaporizing chamber prior to the catalytic chamber was a practical solution. The piperazine or its hydrate may be fed directly to the chamber in which it may be vaporized, usually by heating. The resulting vapors may then be picked up by a stream of inert gas and carried into contact with the catalyst. Or, if so desired, the inert carrier gas and the piperazine may be mixed prior to being fed to the vaporizer. This latter procedure is quite simple where the pierazine is fed to the apparatus in the form of a solution in a solvent the vapors of which are suitable as diluents.

From the vaporizer, the gas and vapor mixture is passed to a catalytic chamber in which the actual dehydrogenation takes place. The catalyst is usually contained in a tubular converter, which is preferably but not necessarily vertically positioned. Passage of the vapors may be either up or down, preferably the latter, when the converter is other than horizontal. A tubular chamber is preferable in that it promotes a more uniform distribution and flow through a packed converter. From the catalyst chamber reacted vapors are passed to a condensing system in which the vapors are condensed and the fixed gases allowed to escape. This condensing system may be of any suitable type.

It was found well to provide a fractionating system in connection with the condenser so that the pyrazine may be separated from any unreacted piperazine, water or other liquids which may be condensed. This fractionator may be a part of the condensing system itself or the total condensate may be collected and fractionated in a subsequent operation. The latter operation is preferable where water is present during the reaction since pyrazine and water appear to form a constant boiling mixture and it may be desirable to dry the total condensate before fractionation. Drying may be readily carried out by using an absorbent such as pelleted sodium hydroxide, anhydrous sodium sulphate, calcium chloride or the like.

Piperazine itself, a piperazine hydrate such as the hexahydrate or even in some cases volatile salts of piperazine may be used as a starting material in the present process. Each has certain advantages and disadvantages. For example, in order to insure steady flow it is helpful to feed the material to the apparatus as a liquid. Since the hydrate melts much more readily than piperazine itself, it has an advantage in this respect. Further, it is more readily vaporized than piperazine. On the other hand, when a hydrated form is used as the raw material more water is present in the condensate with the resultant difficulty in isolating the pyrazine product. Neither form appears to exhibit any particular advantage so far as the actual degree of dehydrogenation which can be finally achieved in concerned. Accordingly, in the present specification and the accompanying claims the term "piperazine" is used generically to include piperazine in a hydrated form.

As a general practice the dilution of vapors being subjected to catalytic action in order to regulate the time of contact between vapor and catalyst, or to depress undersirable side reactions, has become more or less well known. In the present case, any inert gas may be used. It was found that good results could be obtained using nitrogen.

It was also found feasible to regulate the feed of piperazine by diluting it. A satisfactory procedure was found to exist in making up a solution of piperazine in a volatile inert solvent and allowing the solvent vapors to replace all or a major portion of the diluent gas. Piperazine forms an approximately 4% solution in benzene at room temperature. Using such a substantially saturated solution was found to produce good results. Benzene did not interfere with the catalytic reaction and because of its low molecular weight permits a good dilution by weight while maintaining a high mol ratio of diluent to piperazine. Other volatile solvents can be used if so desired, piperazine being soluble for example in such solvents as quinoline, toluene and xylene. Although a saturated benzene solution produces good results, if it is desired to increase the piperazine-solvent ratio it is quite simple to volatilize the solvent separately and blend the vapors before or during preheating. One precaution should be observed in that the benzene or other diluent used should be as nearly sulfur-free as possible.

While the catalytic material may be used per se and effective dehydrogenation obtained, this is not necessarily the best practice. The 100% catalysts are difficult to use effectively. Physically, they are not easy to prepare and handle. In use, it is difficult to obtain effective utilization of the potential catalytic capabilities of the whole catalyst mass. This makes for inefficient use. Similarly, the use of a 100% catalyst makes a reactivation operation more difficult to carry out efficiently. Further, unsupported catalysts ordinarily have poor resistance to high temperature and trouble is usually encountered through sintering during use and reactivation.

Because of these factors, it is preferable that the catalyst be supported on a suitable carrier. For this purpose a number of materials have been found suitable. These include such materials as alumina, "activated alumina," silica, "Celite" and charcoal. The particular carrier chosen should be one which is normaly surface-active but which will not have any appreciable pyrolytic effect on the dehydrogenation reaction which is to be carried out. Alumina clays with appreciable alkali or alkaline earth metal contents therefore are not productive of good supports.

Of the materials noted above, charcoal is perhaps the least desirable. The temperature conditions preferred, both for the reaction and for the reactivation of the catalyst, are rather high and tend to destroy the charcoal support. "Activated alumina" is readily available in several forms, is mechanically strong, easily handled and highly successful in use. It therefore probably is to be preferred.

The support may be in the simple physical form of broken granules screened to a suitable size. However, a preferred embodiment of the practice is to use preformed pellets of powdered material. The preformed pellets have a number of advantages. The size is chosen in accordance with the desired contact time. They are wholly uniform in size which permits of more ready and uniform packing of the converter column. The flow of vapors therethrough is therefore more uniform. The contact time is more easily estimated and held to the desired conditions.

Preparation of the catalysts for use in the present invention is relatively simple. An aqueous solution of a salt of the desired metal is uniformly deposited on the carrier. While any salt may be used, the nitrate is usually readily available and being easily broken down is perhaps preferred. Preferably this deposition is carried out in two or three successive steps, approximately equal amounts being deposited in each step and the carrier being thoroughly dried between depositions. After deposition of the salt the composition is heated to break down the salt and then heated sufficiently to reduce the residue to the desired metal oxide. This usually may be done by heating up to less than about 400° C. but since the catalyst is frequently used somewhat above this temperature it preferably should be calcined to a somewhat higher temperature. Finally, but not always necessarily, it is usually desirable that the calcined catalyst be given a treatment at about the expected reaction temperature range in an atmosphere of hydrogen.

Reaction temperatures used in the present process fall within the general range of about 325°–500° C. The optimum results, however, are usually obtained at an intermediate value within this range. For the oxide catalysts of the present invention, the most desirable range is usually between 375–485° C. While this is considered the reaction temperature it is the temperature of the catalyst body. The actual temperature of the vapors passing thereover may not exactly coincide since such temperatures are not only difficult to measure but will vary with the feed rate and hence for any given catalyst volume on the time of contact. A more precise optimum temperature for a particular catalyst usually exists within the 375–485° C. range, varying somewhat with the particular rate of feed chosen. For example, with a contact time of about five seconds, manganese or chromium oxide on alumina catalysts appear to function best at about 425°–475° C., whereas those of vanadium, tantalum, molybdenum and tungsten appear to be at optimum utility in the somewhat lower range of about 400°–450° C. However, since accurate control of the temperature to these narrower ranges is difficult to maintain over extended periods, the wider range of 375° C. to about 485° C. is a good average practice for the group as a whole.

In the present process use of some diluent is definitely preferable. The amount of diluent used will vary, not only with the molecular weight of the chosen diluent, but also with a number of other factors. In a complex reaction, such as the present one, in which various side reactions occur, the optimum practice must involve at least some element of compromise. For example, in the present reaction, as the partial pressure of piperazine is increased, the total piperazine throughput for a given apparatus and catalyst mass increases. But, the conversion to and yield of ammonia also increases and the total conversion of piperazine, as well as the conversion to and yield of pyrazine falls off markedly. A good compromise of these factors, therefore, indicates that the partial pressure of piperazine entering the conversion chamber should be from about 0.1 to 0.3 or 0.4 atmosphere.

From the point of view of commercial practice the life of a catalyst and its susceptibility to reactivation are also important. In carrying out the development work on the catalysts of the present invention it was found that they could be readily reactivated. That is, carbonaceous material deposited during the dehydrogenation process eventually reduces the activity of the catalyst. These tarry materials may be removed by passing air or oxygen-containing gas over the catalyst. This reactivation is followed by reduction where necessary. The temperature during reactivation must be limited so that the exothermic reactivation process does not result in permanent sintering of the surface. It was also found advisable to keep the catalysts in an atmosphere of hydrogen wherever possible from the time it was reactivated to the time it was ready to be used again.

The invention will be more fully described in conjunction with the following examples which are intended as illustrative only and not by way of limitation. Unless otherwise noted, all parts are by weight and percentages of conversion and yields are expressed in mol percent.

EXAMPLE 1

In order to show the relative efficacy of catalysts of the present invention, successive runs were made, under approximately equivalent conditions but over a series of different catalytic masses comprising about 10% of the catalyst on an "activated" alumina carrier. No diluents were used. Molten piperazine was fed at a fixed rate to a vaporizer, the vapors being preheated to about the reaction temperature and passed vertically downward through the heated catalyst body, the temperature of the latter being taken as the temperature of the reaction. Contact times averaged about five seconds. The reaction products were passed through a condenser and ice trap to remove the condensable fractions, the non-condensable fraction being bubbled through sulfuric acid to obtain the ammonia yield. In each run the contact time was approximately five seconds. The pyrazine product and unconverted piperazine were isolated by fractional distillation. The catalysts used and illustrative results obtained are shown in the following table:

Table I

| Catalyst | Temperature, °C. | Conversion of Piperazine, Per Cent | Yield, Per Cent | |
|---|---|---|---|---|
| | | | $NH_3$ | Pyrazine |
| 12% $V_2O_5$ | 400–410 | 96 | 68 | 23 |
| 12% $Cr_2O_3$ | 390–400 | 36 | 87 | 25 |
| 12% $Cr_2O_3$ | 440–450 | 83 | 32 | 18 |
| 10% $MnO_2$ | 390–400 | 34 | 11 | 14 |
| 10% $MnO_2$ | 435–445 | 72 | 39 | 12 |
| 9% $MoO_3$ | 390–400 | 99 | 66 | 18 |
| 15% $WO_3$ | 400–415 | 98 | 91 | 13 |

EXAMPLE 2

A sample of piperazine was made into a saturated solution at room temperature in thiophene-free benzene. Successive portions of this solution were vaporized and passed over a catalyst mass comprising about 12% of chromium oxide supported on 4-8 mesh granules of activated alumina. The vaporized material was preheated to approximately the catalyst temperature, the latter being considered the reaction temperature. The temperatures were varied from about 250-500° C. in different runs. The total condensable portion in the reacted vapors was recovered and the pyrazine fraction isolated therefrom by fractional distillation. The optimum temperature range appeared to be between about 400-500° C. With an average contact time of about 3 seconds, substantially complete conversion of piperazine with pyrazine yields as high as 40% were obtained.

*Table II*

| Temperature Range, °C. | Per cent Conversion of Piperazine | | | Yields, per cent | |
|---|---|---|---|---|---|
| | Total | to NH$_3$ | to Pyrazine | NH$_3$ | Pyrazine |
| 250-300 | | None | | | |
| 300-350 | | Traces | | | |
| 380-400 | 36 | 32 | 6 | 87 | 25 |
| 430-450 | 98 | 55 | 15 | 56 | 18 |
| 450-470 | 99 | 49 | 23 | 46 | 23 |
| 460-490 | 98 | 32 | 41 | 32 | 41 |

EXAMPLE 3

As was noted it is probably desirable that the piperazine vapors be passed over the catalyst in a diluted condition using as the diluent an inert gas or vapor. In order to illustrate the effect of dilution a number of runs were made on a carrier comprising about 10% of chromium oxide on ⅛ inch pellets of "activated alumina." Comparative runs using no diluent and varying amounts of benzene were made. Illustrative results of a number of such runs are shown in the following table:

*Table III*

| Diluent | Piperazine Conc., per cent | Temperature, °C. | Conversion of Piperazine, per cent | Yields, per cent | |
|---|---|---|---|---|---|
| | | | | NH$_3$ | Pyrazine |
| None | 100 | 380-400 | 38 | 73 | Trace |
| Do | 100 | 470-475 | 99 | 54 | 21 |
| Benzene | ¹37 | 450-470 | 82 | 34 | 16 |
| Do | ¹14 | 450-460 | 99 | 46 | 23 |
| Do | ²7++ | 450-470 | 98 | 32 | 42 |

¹ Diluent separately vaporized.
² Diluent as solvent in feed.

I claim:

1. The method of producing pyrazine which comprises completely vaporizing piperazine; passing the vaporized material over a catalyst selected from the group consisting of the oxides of the members of the left sub-groups of the fifth, sixth and seventh groups of the periodic arrangement of elements, at dehydrogenation temperatures; condensing the condensable portion of the reacted vapors and isolating the pyrazine content therefrom.

2. A process according to claim 1 in which the temperatures used are from about 375°-480° C.

3. A process according to claim 1 in which the catalytic mass comprises about 2-20% of the oxide catalyst supported on a non-prolytic carrier.

4. A process according to claim 1 in which the oxide catalyst is an oxide of chromium.

5. A process according to claim 1 in which the oxide catalyst is an oxide of vanadium.

6. A process according to claim 1 in which the oxide catalyst is an oxide of molybdenum.

7. A process according to claim 1 in which the oxide catalyst is an oxide of chromium supported on "activated" alumina, the oxide comprising 2-20% of the total weight.

8. A process according to claim 1 in which the oxide catalyst is an oxide of chromium supported on "activated" alumina, the oxide comprising 2-20% of the total weight, the temperature being about 400°-480° C.

9. The method of producing pyrazine which comprises forming a mixture of completely vaporized piperazine and an inert diluent in which the partial pressure of the piperazine is about 0.1-0.4 atmosphere; passing the mixture at dehydrogenation temperatures over a catalyst selected from the group consisting of the oxides of the members of the left sub-groups of the fifth, sixth and seventh groups of the periodic arrangement of elements, at dehydrogenation temperatures; condensing the condensable portion of the reacted vapors and isolating the pyrazine content therefrom.

10. A process according to claim 9 in which the diluent is a completely vaporized material selected from the group consisting of water, quinoline, benzene, xylene and toluene.

11. A process according to claim 9 in which the temperatures used are from about 375°-480° C.

12. A process according to claim 9 in which the catalytic mass comprises about 2-20% of the oxide catalyst supported on a non-pyrolytic carrier.

13. A process according to claim 9 in which the oxide catalyst is an oxide of chromium.

14. A process according to claim 9 in which the oxide catalyst is an oxide of vanadium.

15. A process according to claim 9 in which the oxide catalyst is an oxide of molybdenum.

16. A process according to claim 9 in which the oxide catalyst is an oxide of chromium supported on "activated" alumina, the oxide comprising 2-20% of the total weight.

17. A process according to claim 9 in which the oxide catalyst is an oxide of chromium supported on "activated" alumina, the oxide comprising 2-20% of the total weight, the temperature being about 400°-480° C.

JAMES KENNETH DIXON.

REFERENCES CITED

The following references are of record in the file of this patent:

UNITED STATES PATENTS

| Number | Name | Date |
|---|---|---|
| 2,184,235 | Groll | Dec. 19, 1939 |
| 2,371,087 | Webb | Mar. 6, 1945 |
| 2,400,398 | Dixon | May 14, 1946 |

OTHER REFERENCES

Jour. Am. Chem. Soc., vol. 56 (1934), pp. 153-4.